(12) United States Patent
Fiebig et al.

(10) Patent No.: US 8,769,954 B2
(45) Date of Patent: Jul. 8, 2014

(54) FREQUENCY-TUNABLE BRACKETLESS FLUID MANIFOLD

(75) Inventors: Kevin Michael Fiebig, Cincinnati, OH (US); Joshua Brown, Cincinnati, OH (US); Joseph Nath, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1226 days.

(21) Appl. No.: 12/650,972

(22) Filed: Dec. 31, 2009

(65) Prior Publication Data
US 2011/0154824 A1 Jun. 30, 2011

(51) Int. Cl.
*F02C 1/00* (2006.01)
*F02G 3/00* (2006.01)

(52) U.S. Cl.
USPC .............. 60/739; 60/746; 60/747; 60/734

(58) Field of Classification Search
USPC ................. 60/739, 746, 747, 734
See application file for complete search history.

(56) References Cited

U.S. PATENT DOCUMENTS

| | | | |
|---|---|---|---|
| 3,945,759 A | 3/1976 | Bobo | |
| 4,155,681 A | 5/1979 | Linko, III et al. | |
| 4,214,851 A | 7/1980 | Tuley et al. | |
| 4,862,693 A * | 9/1989 | Batakis et al. | 60/739 |
| 4,903,478 A | 2/1990 | Seto et al. | |
| 5,036,657 A | 8/1991 | Seto et al. | |
| 5,100,291 A | 3/1992 | Glover | |
| 5,168,698 A * | 12/1992 | Peterson et al. | 60/779 |
| 5,231,833 A | 8/1993 | MacLean et al. | |
| 5,241,289 A | 8/1993 | Markowske et al. | |
| 5,271,711 A | 12/1993 | McGreehan et al. | |
| 5,399,066 A | 3/1995 | Ritchie et al. | |
| 5,771,696 A | 6/1998 | Hansel et al. | |
| 5,848,525 A | 12/1998 | Spencer | |
| 6,367,240 B1 | 4/2002 | Hoyer et al. | |
| 6,512,192 B1 | 1/2003 | Yee et al. | |
| 6,965,185 B1 | 11/2005 | Kaminski et al. | |
| 7,090,462 B2 | 8/2006 | Martin et al. | |
| 7,374,396 B2 | 5/2008 | Martin et al. | |
| 7,992,390 B2 * | 8/2011 | Patel et al. | 60/734 |

* cited by examiner

*Primary Examiner* — Craig Kim
(74) *Attorney, Agent, or Firm* — William Scott Andes; Trego, Hines & Ladenheim, PLLC

(57) ABSTRACT

A fluid manifold apparatus includes: (a) an array of spaced-apart manifold fittings, each manifold fitting aligned in a predetermined angular orientation. Each manifold fitting includes: (i) a tubular neck; (ii) a pair of spaced-apart tubular arms extending away from a first end of the neck; and (iii) a coupling connected to a second end of the neck; and (b) a plurality of curved tubes, each tube being coupled to one arm of each of two adjacent manifold fittings.

6 Claims, 7 Drawing Sheets

FREQUENCY-TUNABLE BRACKETLESS FLUID MANIFOLD

BACKGROUND OF THE INVENTION

This invention relates generally to fluid handling, and more particularly to apparatus and methods for fluid manifolds in gas turbine engines.

A gas turbine engine includes a turbomachinery core having a high pressure compressor, a combustor, and a high pressure turbine in serial flow relationship. The core is operable in a known manner to generate a primary gas flow. Depending on the engine's configuration, the core may be combined with a fan and low pressure turbine system to generate propulsive thrust, or with a work turbine to extract mechanical energy and turn a driveshaft or propeller.

In conventional gas turbine engines, fuel is introduced to the combustor through an array of fuel nozzles which are coupled to an external manifold surrounding the combustor. In operation, pressurized fuel is fed to the manifold. The manifold then distributes the pressurized fuel to the individual fuel nozzles. Such manifolds are commonly manufactured from various tubes and fittings, and are secured to the combustor with brackets and other mounting hardware. Such manifolds experience significant vibration during engine operation.

Thermal growth is a critical design criterion for these fuel manifolds. The cases that support the fuel nozzles grow as the engine warms, but the temperature of the fuel in the manifold stays relatively cool. This temperature difference, coupled with the different material growth rates of various components, creates a thermal loading on the manifold. To avoid fatigue failure, the manifold's properties such as stiffness, damping, etc. must be designed so as to avoid excitation of one or more of the manifold's natural frequencies within the engine operating range while providing proper flexibility for thermal growth.

These manifolds are unique to each specific engine model. This requires a substantial design effort and testing iterations, leading to high engineering costs. Furthermore, the typical geometry and large part count leads to relatively high system weights.

BRIEF SUMMARY OF THE INVENTION

These and other shortcomings of the prior art are addressed by the present invention, which provides a frequency-tunable fluid manifold apparatus.

According to one aspect of the invention, a fluid manifold apparatus includes: (a) an array of spaced-apart manifold fittings, each manifold fitting aligned in a predetermined angular orientation. Each manifold fitting includes: (i) a tubular neck; (ii) a pair of spaced-apart tubular arms extending away from a first end of the neck; and (iii) a coupling connected to a second end of the neck; and (b) a plurality of curved tubes, each tube being coupled to one arm of each of two adjacent manifold fittings.

According to another aspect of the invention, a method of assembling a fluid manifold includes: (a) providing an array of spaced-apart manifold fittings, each manifold fitting having: (i) a tubular neck; (ii) a pair of spaced-apart tubular arms extending away from a first end of the neck; and (iii) a coupling connected to a second end of the neck; (b) placing each manifold fitting in a predetermined angular orientation; and (c) providing a plurality of curved tubes, and coupling one end of each tube to one arm of each of two adjacent manifold fittings; (d) such that the assembled manifold has a predetermined first natural frequency.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
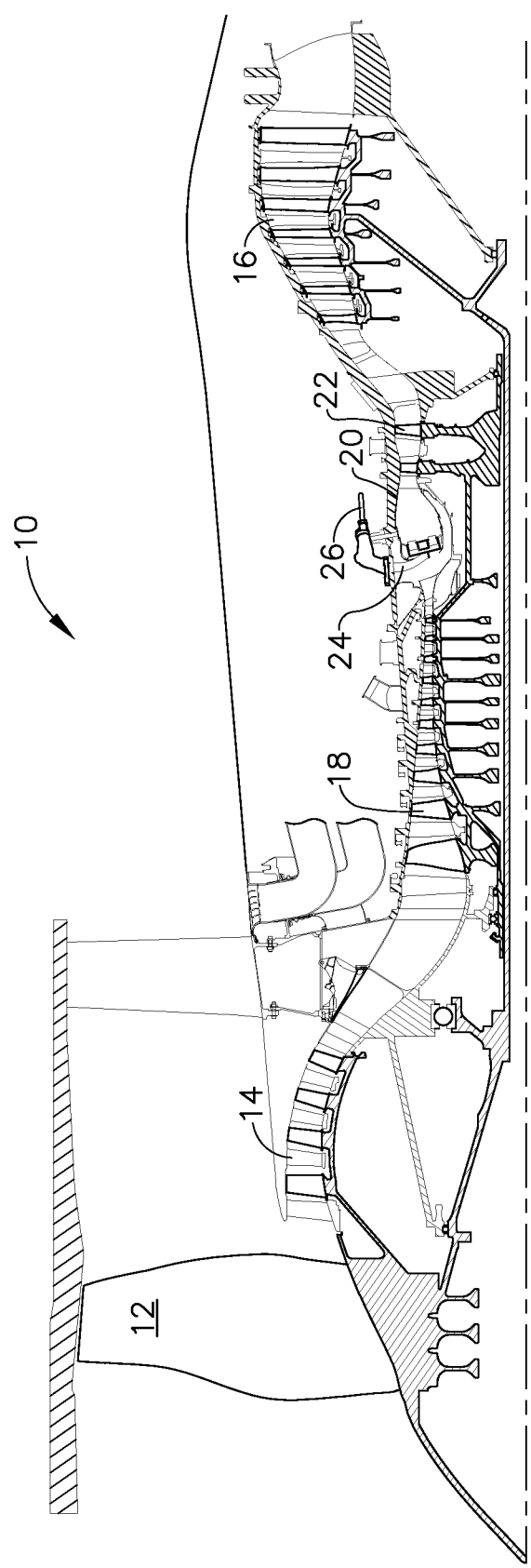
FIG. 1 is a schematic half-sectional view of a gas turbine engine incorporating a fluid manifold constructed in accordance with an aspect of the present invention.

Referring to the drawings wherein identical reference numerals denote the same elements throughout the various views, FIG. 1 depicts an exemplary gas turbine engine 10 having a fan 12, a low pressure compressor or "booster" 14 and a low pressure turbine ("LPT") 16 collectively referred to as a "low pressure system", and a high pressure compressor ("HPC") 18, a combustor 20, and a high pressure turbine ("HPT") 22, collectively referred to as a "gas generator" or "core". Together, the high and low pressure systems are operable in a known manner to generate a primary or core flow as well as a fan flow or bypass flow. While the illustrated engine 10 is a high-bypass turbofan engine, the principles described herein are equally applicable to turboprop, turbojet, and turboshaft engines, as well as turbine engines used for other vehicles or in stationary applications. The principles of this invention are also equally applicable to other fields where a vibration-resistant fluid manifold is required.

The combustor 20 includes a radial array of fuel nozzles 24 which are coupled to a manifold 26 surrounding the combustor 20. In operation, pressurized fuel is fed to the manifold 26 by a fuel metering system such as a hydromechanical unit, FMU, PMU, or FADEC system of a known type (not shown). The fuel is then distributed by the manifold 26 to the individual fuel nozzles 24. The illustrated example shows a single-stage manifold and fuel nozzles, but it will be understood that the principles of the present invention are applicable to multi-circuit systems as well.

Figure 2:
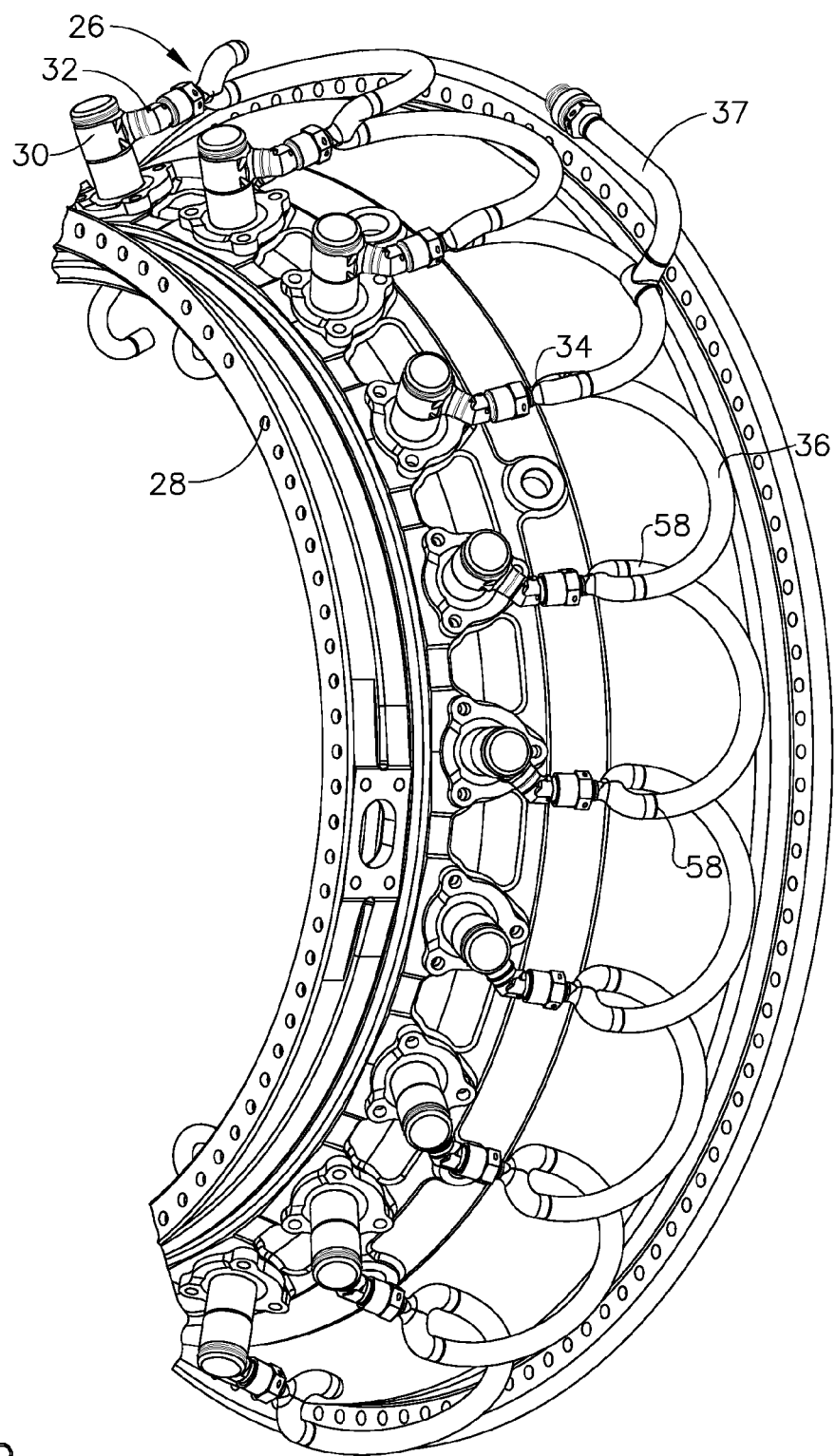
FIG. 2 is a partial perspective view of a combustor of the engine of FIG. 1, showing a fluid manifold mounted thereto.

The manifold 26 is shown in more detail in FIG. 2. The casing 28 of the combustor 20 can be seen with the inlet stems 30 of the fuel nozzles 24 protruding therefrom. Each inlet stem 30 incorporates an inlet fitting 32 of a known type. In the illustrated example, the nozzle inlet stems 30 penetrate the case 28 in a generally radial direction, and the inlet fittings 32 extend in a generally axial direction. Coupled to each inlet fitting 32 is a manifold fitting 34. The manifold fittings 34 are interconnected by tubes 36. In the illustrated example each tube 36 is generally "C"-shaped when seen in plan view, and has a constant radius of curvature. One or more feed tubes 37 are coupled to the manifold 26 and serve to allow fuel flow into the manifold 26 from a fuel metering and control system of a conventional type (not shown). Most typically the manifold 26 and its constituent components would be made from a metallic alloy, such as an iron- or nickel-based alloy.

FIGS. 5-10 illustrate one of the manifold fittings 34 in more detail. The manifold fitting 34 is generally "Y"-shaped with a tubular central neck 38 and two spaced-apart, generally parallel tubular arms 40 extending therefrom. As used herein, the term "tubular" denotes a member which has a wall that encloses a volume for fluid flow therethrough and does not necessarily imply a structure that has a purely circular cross-section or a constant wall thickness. The neck 38 is connected to a coupling 42.

The coupling 42 includes a tubular inner member 44 having a first end 46 connected to the neck 38, and a second end which defines a seat 48. When connected to the inlet stem 30, the seat 48 receives a ball-nose 50 of the inlet fitting 32 which has a shape complementary to the seat 48. A groove 53 is formed in the cylindrical surface of the inlet fitting 32 adjacent the ball-nose 50 and receives a resilient sealing element 55, which seals against the inner member 44. In the illustrated example the sealing element 55 is an O-ring. The outer surface of the inner member 44 includes an annular shoulder 51. A collar 52 surrounds the inner member 44 and includes an annular, radially-inwardly-extending flange 54 that engages the shoulder 50. The interior of the collar 52 includes threads 56 that engage mating threads 57 of the inlet fitting 32. The exterior of the collar 52 is formed into polygonal flats or other suitable wrenching surfaces 60. Other types of coupling configurations could be used to couple the manifold fitting 34 to the inlet fitting 32 so long as they provide a leak-free joint.

Figure 3:
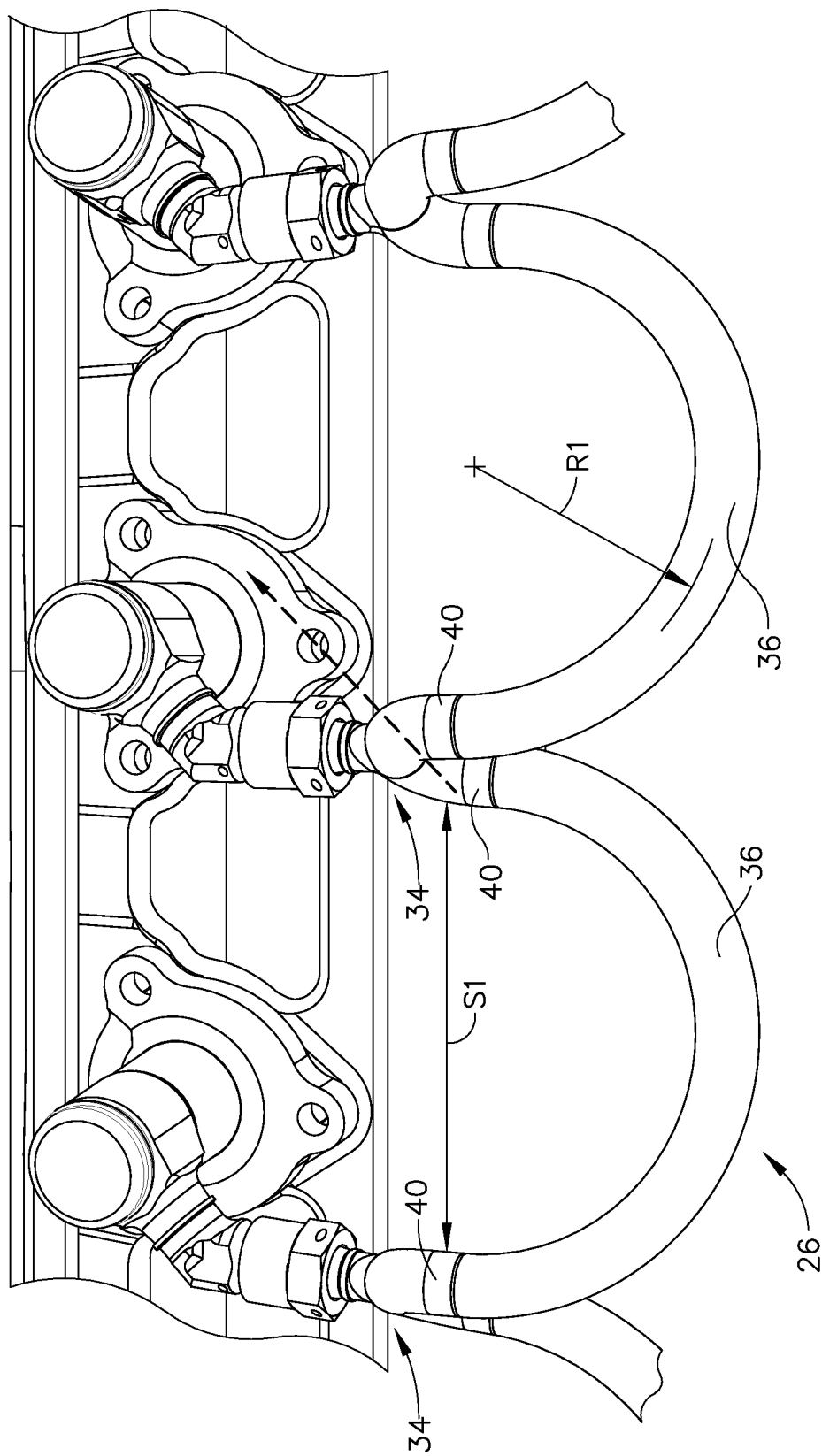
FIG. 3 is a plan view of the manifold shown in FIG. 2, with fluid fittings installed in a first position.

As best seen in FIG. 3, the tubes 36 are continuously curved so as to form a "U" or "C" shape. In this example the tubes 36 have a constant radius of curvature, but this aspect may be varied as desired to suit a particular application. Each tube 36 has opposed ends 58 which are connected to the arms 40 of adjacent manifold fittings 34. The tubes 36 may be connected to the manifold fittings 34 in any manner that provides a secure, leak-free joint, for example by the use of thermal or mechanical bonding, adhesives, or mechanical joints or fasteners. As illustrated, the tubes 36 form butt joints 62 (see FIG. 5) with the manifold fittings 34 that are brazed or welded together in a known manner.

The manifold configuration is "modular" in the sense that a single type of manifold fitting 34 may be coupled to the inlet stems 30 in a variety of different angular orientations and then interconnected with tubes 36 suitable for the selected orientation. By "twisting" the manifold fitting 34 clockwise or counter-clockwise from a nominal position, a designer may effectively increase or decrease the tubing length between neighboring fuel nozzles 24, with the result of changing or "tuning" the manifold's natural frequency. Smaller engines generally have a higher frequency of operation, and generally experience less total thermal growth. Larger engines generally have a lower frequency of operation, and generally experience more total thermal growth. The ability to tune the manifold's natural frequency allows it to be designed to each engine's specific needs, without the typical systemic redesign seen in the prior art when comparing one engine model to another.

For example, FIG. 3 shows a portion of the manifold 26 with the manifold fittings 34 rotated or "clocked" to a first angular orientation. For the sake of illustration, an arrow depicts the plane in which the arms 40 lie. In this position, the lateral spacing between the connected arms 40 of two adjacent fittings 34, denoted "S1", is relatively small and the radius of the tube 36 which interconnects the arms 40, denoted "R1", is relatively small as well. As a result, the first natural frequency of the manifold 26 is relatively high. Because the tube 36 spans a relatively short point-to-point distance as compared to prior art designs, there is no need for a separate bracket to mount the tubes 36 to the casing 28.

Figure 4:
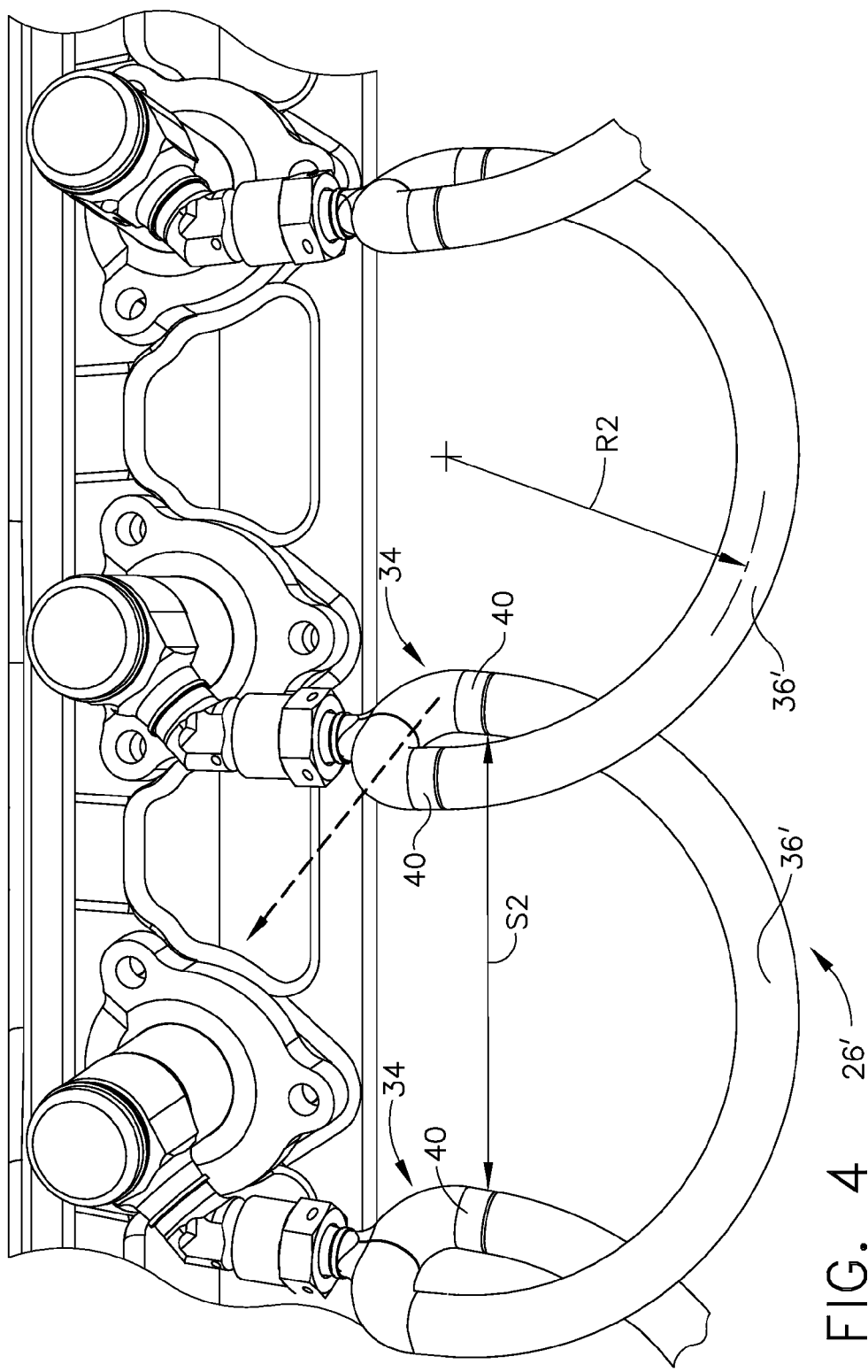
FIG. 4 is a plan view of the manifold shown in FIG. 2, with fluid fittings installed in a second position.
Figure 5:
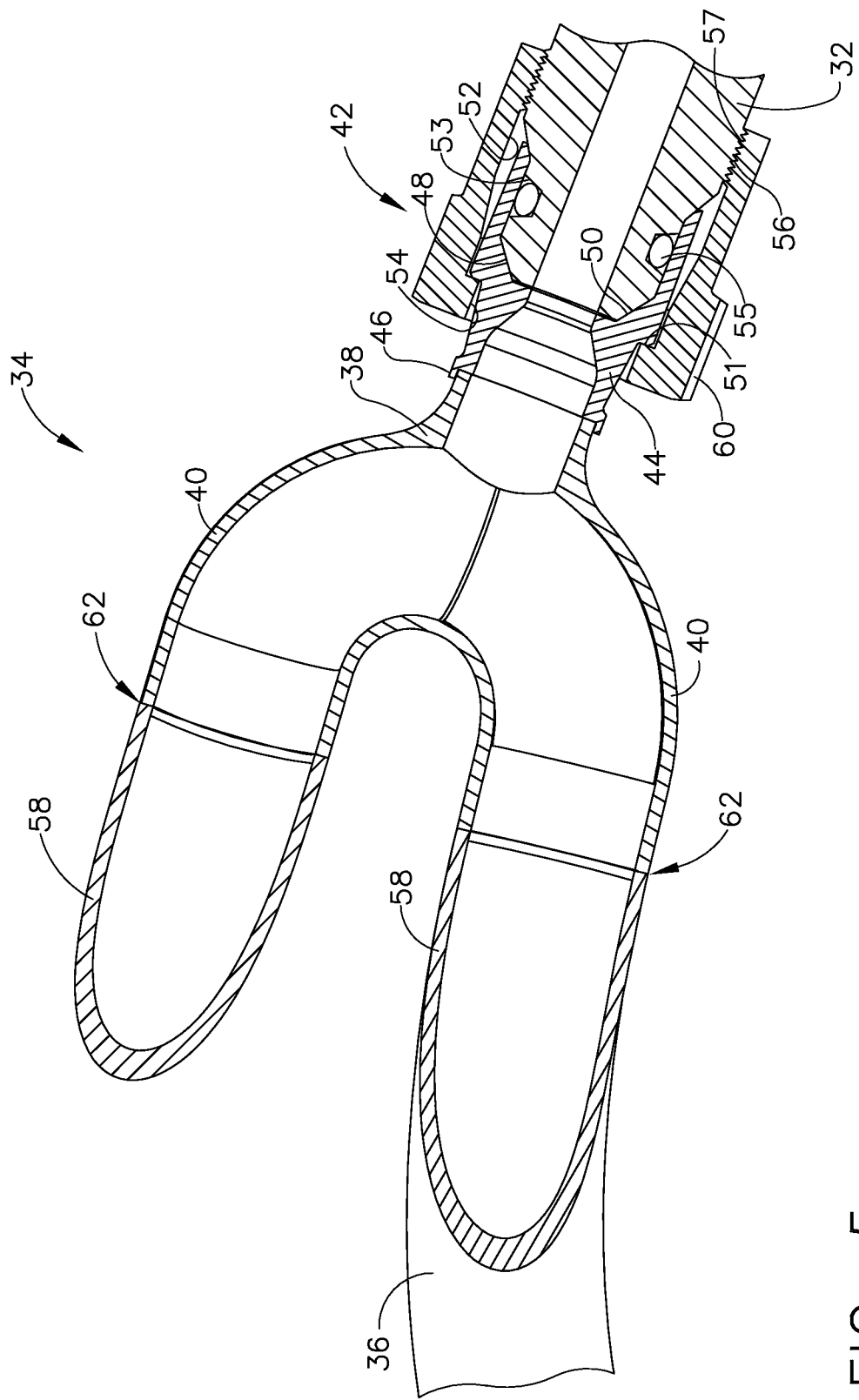
FIG. 5 is a cross-sectional view of one of the fluid fittings of the manifold.
Figure 8:
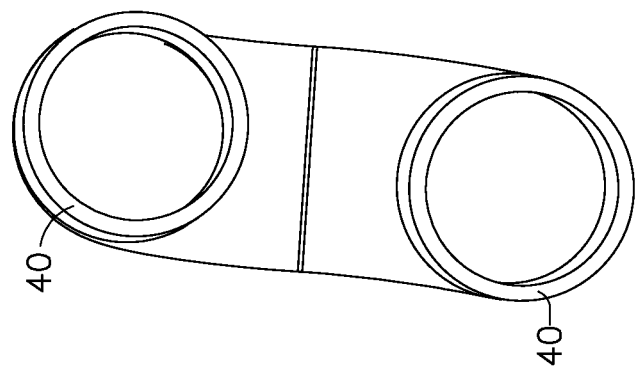
FIG. 8 is a rear view of the fitting of FIG. 5.
Figure 7:
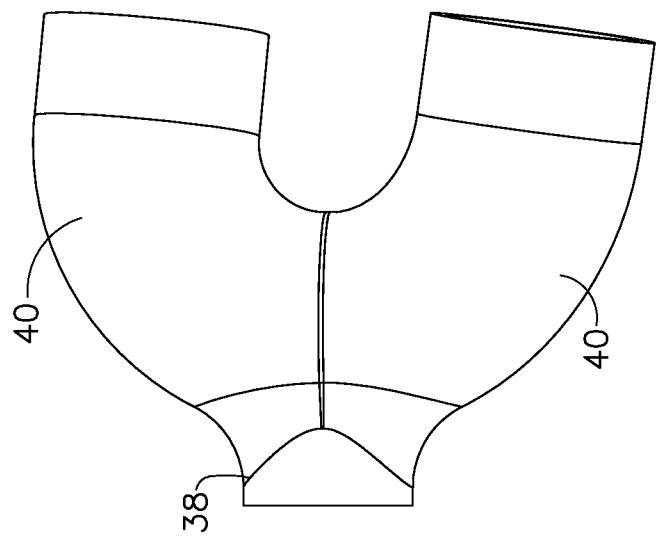
FIG. 7 is a side view of the fitting of FIG. 5.
Figure 6:
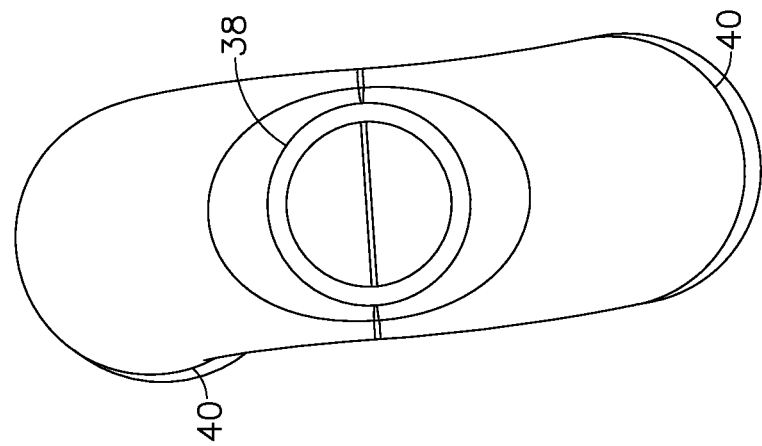
FIG. 6 is a plan view of the fitting of FIG. 5.
Figure 10:
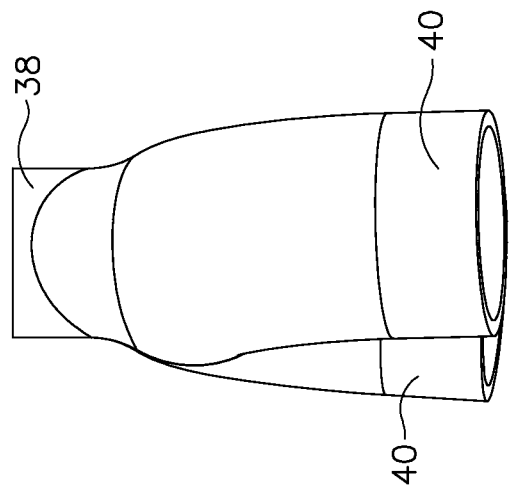
FIG. 10 is a right side view of the fitting of FIG. 5.
Figure 9:
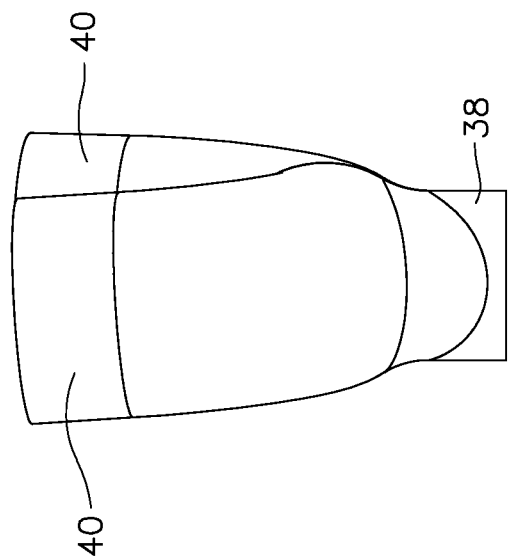
FIG. 9 is a left side view of the fitting of FIG. 5.

FIG. 4 shows a portion of a manifold 26' assembled using manifold fittings 34 of identical construction to those shown in FIG. 3. The manifold fittings 34 in FIG. 4 are rotated or "clocked" to a second angular orientation. An arrow depicts the plane in which the arms 40 lie, which is about 60 degrees away from the position shown in FIG. 3. In this position, the lateral spacing between connected fitting arms 40, denoted "S2", is larger than the spacing S1, and the tube 36' which interconnects the arms 40 is relatively larger than the tubes 36 as well. For example, the radius R2 of the tube 36' may be about 1.25 times the radius R1 of the tube 36. As a result, the first natural frequency of the manifold 26' is computed to be about 25% lower than that of the manifold 26. In this example, the stress induced by thermal loading on manifold 26' with a tube radius of R2 is computed to be about 15% lower in magnitude than the stress induced by thermal loading on manifold 26 with a tube radius of R1. The position of the manifold fittings 34 is infinitely variable as dictated by design requirements.

As part of the design process, the manifold's vibration characteristics would be analyzed, for example using a tool such as finite element analysis software, and then a fitting orientation and tube radius would be selected based on the required natural frequency. The design process is vastly simplified compared to the prior art because the manifold fittings 34 are common to many different manifolds 26. The tubes 36 may be produced in one or more "stock" lengths corresponding to several default orientations of the manifold fittings 34.

The fluid manifold 26 described herein has several advantages over a conventional design. Depending on the specific configuration, the manifold 26 may contain as few as one-tenth as many parts as prior art manifold system designs. It may weigh only about half as much as a prior art manifold system and has a reduced part envelope. Design cycle time will also be decreased because of the simplified nature of the design.

The foregoing has described a frequency-tunable fluid manifold. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:
1. A fluid manifold apparatus, comprising:
(a) an array of spaced-apart manifold fittings, where each manifold fitting comprises:
(i) a generally tubular neck;
(ii) a pair of spaced-apart generally tubular arms extending away from a first end of the neck such that the arms and neck collectively define a Y-shape; and
(iii) a coupling connected to a second end of the neck, wherein the neck and the arms are rotatable as a unit relative to the coupling, wherein each of the couplings is connected to a fuel nozzle inlet stem of a fuel nozzle that is mounted to a combustor of a gas turbine engine; and
(b) a plurality of curved tubes, each tube being coupled to one arm of each of two adjacent manifold fittings.

2. The apparatus of claim 1 wherein the coupling comprises an inner member and a collar surrounding the inner member.

3. The apparatus of claim 2 wherein the collar is threaded and includes an annular flange which bears against a shoulder of the inner member.

4. The apparatus of claim 1 wherein each inlet stem includes an inlet fitting which includes:
   (a) a ball-nose having a shape complementary to a seat defined by the inner member of the coupling; and
   (b) a resilient sealing element disposed in a groove in an outer surface of the inlet fitting.

5. The apparatus of claim 1 wherein each tube has a constant radius of curvature.

6. The apparatus of claim 1 wherein the ends of the tubes are rigidly coupled to the arms of the manifold fittings.

\* \* \* \* \*